United States Patent

[11] 3,608,810

| [72] | Inventor | Eugene K. Kooser<br>Houston, Tex. |
|---|---|---|
| [21] | Appl. No. | 781,623 |
| [22] | Filed | Dec. 5, 1968 |
| [45] | Patented | Sept. 28, 1971 |
| [73] | Assignee | World Weather Inc.<br>Houston, Tex. |

[54] METHODS OF TREATING ATMOSPHERIC CONDITIONS
9 Claims, No Drawings

[52] U.S. Cl. ......................................... 239/2 R
[51] Int. Cl. ......................................... A01g 15/00
[50] Field of Search ............................. 252/305, 310; 239/2, 14

[56] References Cited
UNITED STATES PATENTS

| 3,084,024 | 4/1963 | Hamilton et al. | 239/2 X |
|---|---|---|---|
| 3,375,148 | 3/1968 | Finnegan et al. | 239/2 X |
| 3,378,201 | 4/1968 | Glew et al. | 239/2 |
| 3,429,507 | 2/1969 | Jones | 239/2 |
| 2,895,679 | 7/1959 | Elton | 239/2 |
| 2,934,275 | 4/1960 | Ball | 239/2 |

OTHER REFERENCES

Space/Aeronautics, " Getting Rid of Airport Fog" Oct. 1968, Pages 80– 82 relied on.

*Primary Examiner*—Lloyd L. King
*Attorney*—Christen & Sabol

ABSTRACT: Methods of treating atmospheric conditions including dispensing in the atmosphere surfactants, water-soluble polyelectrolytes or mixtures thereof, methods of dispersing fog by dispensing fog-coalescent materials around an unstable spot in the fog and by dispensing fog-coalescent materials in a substantially straight path through an area to be cleared, and methods of increasing rain by dispensing surfactants, water-soluble polyelectrolytes or mixtures thereof around an unstable spot in a cloud.

METHODS OF TREATING ATMOSPHERIC CONDITIONS

BACKGROUND OF THE INVENTION

The present invention pertains to methods of treating atmospheric conditions and more particularly to methods of treating atmosphere conditions by dispensing materials therein to cause coalescence of water droplets.

Treatment of atmospheric conditions has long been attempted to increase rain, prevent or suppress hail, and disperse fog; however, until the present no methods of treating the atmosphere were effective to regularly provide the above objectives. Conventional methods of increasing rain, suppressing hail and dispersing fog, such as by dispensing salt in the atmosphere have been entirely unpredictable and thus do not provide the dependability desired when treating conditions that can cause disastrous results to man, crops and/or structures.

Part of the reason for the lack of success of prior art methods of treating atmospheric conditions is that the atmospheric conditions sought to be controlled are not fully understood, That is, the conditions of the clouds from which rain is sought to be increased, the cumulus hail clouds and the characteristics of fog banks have not been understood sufficiently by those attempting to treat these conditions.

This is especially true with respect to fog banks, and the dispersal of fog is a pressing problem due to the stifling effect of fog on air and surface travel. It is not uncommon for fog to close airports and seaports for days at a time as well as limiting road travel, and stoppage of air and surface travel causes millions of dollars in losses yearly. Furthermore, fogs can be lethal in that they enhance air pollution and stifle air movement.

Prior art methods of atmospheric treatment have suffered from the disadvantages of great expanse due to the quantity of materials used and long reaction time as well as unpredictability and general ineffectiveness.

SUMMARY OF THE INVENTION

Accordingly, it is an object of the present invention to treat atmospheric conditions by dispensing materials therein to cause coalescence of water droplets.

Another object of the present invention is to treat the atmosphere with surfactants to decrease surface tension and cause water droplets therein to coalesce.

The present invention has another object in that atmospheric conditions are treated with water-soluble polyelectrolytes to remove like charges on water droplets to permit coalescence.

A further object of the present invention is to disperse fog by treating the fog with water-soluble polyelectrolytes and surfactants.

Another object of the present invention is to disperse fog by dispensing fog coalescent materials in a path transverse to wind direction.

The present invention has another object in that fog is dispersed by dispensing fog coalescent materials at a weak or unstable point in a fog bank and working toward the area to be cleared.

Another object of the present invention is to disperse fog over a specified area by dispensing fog-coalescent chemicals in a path over the center of the area and then dispensing fog-coalescent materials in a pattern over the area after fog in the path has commenced coalescence.

The methods of the present invention are advantageous over the methods of the prior art in that atmospheric conditions may be treated of the prior art in that atmospheric conditions may be treated with predictable results in a short time with a minimum of materials.

The present invention is generally characterized in methods for treating portions of the unconfined, nonvacuous atmosphere by dispensing therein surfactants, water-soluble polyelectrolytes of mixtures thereof. The present invention further includes methods of dispersing fog including detecting weak or unstable points in the fog and dispensing fog-coalescent materials therein, and dispensing fog-coalescent materials in a substantially straight path through a specified area to be cleared, detecting windrows parallel to the path and dispensing fog-coalescent materials in a pattern over the specified area.

Further objects and advantages of the present invention will become apparent from the description of the preferred embodiments.

DESCRIPTION OF THE PREFERRED EMBODIMENTS

The primary object in increasing rainfall, suppressing hail and dispersing fog is the same; that is, since clouds and fogs are composed of masses of water droplets to cause the water droplets in the cloud or fog to coalesce and drop to the ground. It is believed that these water droplets have a like charge and form a surface under tension to thereby provide a highly stable equilibrium state. However, it is believed that stability and equilibrium throughout a cloud or fog bank varies, and one of the concepts of the present invention is to attack a cloud or fog bank at its weakest or most unstable point.

The present invention contemplates dispensing surfactants and water-soluble polyelectrolytes either singularly or in admixture with each other in the atmosphere in order to cause coalescence of water droplets therein.

Any surfactant may be dispensed in the atmosphere in accordance with the present invention since surfactants are defined as surface-active agents which includes any compounds that affect surface tension when dissolved in water or water solutions such as sodium salts of high molecular weight alkyl sulfates, or sulfonates. It is clear that while all surfactants will provide a desired results, the more desirable surfactant is chosen by its minimal effect on life on the ground.

Examples of surfactants useful in practicing the present invention include nonionic surfactants such as alkyl phenyl ether of polyethylene glycol; trimethyl nonyl ether of polyethylene glycol; and alkyl ether of polyalkylene glycols and ionic surfactants such as $C_4H_9CH(C_2H_5)C_2H_4CH(SO_4Na)$ $C_2H_4CH(CH_5)_2$; $[C_4H_9CH(C_2H_5)CH_2]_2NaPO_4$; $C_4H_9CH(C_2H_5)$ $C_2H_4CH(SO_4Na)CH_2CH(CH_3)_2$; $C_4H_9CH(C_2H_5)CH_2SO_4Na$ and $C_3H_7CH_2C(C_2H_5)$ :$CHSO_2ONa$ The surfactants can also be incorporated as components of synthetic detergents which include mixtures of surface-active agents with inorganic salts, such as: sodium tripolyphosphates, pryophosphates and sodium sulfates. One commercial synthetic detergent useful in practicing the present invention includes a mixture of sodium tripolyphosphate and sodium lauryl sulfate.

It is believed that surfactants operate on a cloud or fog bank by permitting water droplets to change from a spherical to an elongated shape and join together to form large drops of water which fall to the ground. This coalescence of water droplets may be the actual objective of a project such as to increase rainfall or it may be the requirement for stopping the growth of a prospective hail cloud or dispersing a fog bank.

Similarly, any water-soluble polyelectrolyte may be dispensed in the atmosphere in accordance with the present invention with the practical choice in consideration of ground effect mentioned above with respect to surfactants. Polyelectrolytes are high molecular weight polymers of either natural origin or of a synthetic nature which exhibit properties similar to conventional electrolytes. However, polyelectrolytes in solution do not disassociate to give a uniform distribution of positive and negative ions since the ions of one polarity are bound in the polymer chain and only ions of the opposite polarity are permitted to freely diffuse.

Polyelectrolytes are commercially available and examples thereof suitable for practicing the present invention include polymers containing recurring sulfonium groups such as those taught by U.S. Pat. No. 3,401,152; polymers containing recurring phosphonium groups such as polymers of trivinyl phosponium halides taught by U.S. Pat. NO. 3,294,764 and polymers containing recurring ammonium groups such as quadinary ammonium groups such as those taught by U.S. Pat. No. 3,265,734.

RETEN 210, a polyelectrolyte manufactured by Hercules Powder Company and a polyelectrolyte manufactured by Calgon Catalogued as 823-C have been found suitable for practicing the present invention.

As previously mentioned, it is believed that along with the surface tension of water droplets, a cloud or fog bank is also maintained in a state of equilibrium by similar charges on the water droplets which cause a suspended state of repelling water droplets. Thus by dispensing a water-soluble polyelectrolyte in the cloud or fog bank, some of the charges will be altered to cause attraction of water droplets to form larger drops and fall to the ground to thereby cause increased rainfall, suppress the growth of prospective hail clouds or disperse fog.

Mixtures of surfactants and water-soluble polyelectrolytes are obviously very effective in causing coalescence of water droplets due to the combined decrease in surface tension and the removal of like charges, and the proportions utilized in such mixtures are not critical and may depend on the atmosphere being treated. Normally a mixture of 50 parts surfactant to 50 parts water-soluble polyelectrolyte is very effective; however, where a thin fog is to be dispersed, for example, it is desirable to use a greater percentage of surfactant. One example of a commercially available mixture of water-soluble polyelectrolytes and surfactants useful with the present invention is Ultra-Blend 100 manufactured by The Witco Company.

A method for increasing rainfall according to the present invention includes passing under a cloud and checking for precipitation. This may be accomplished visually by a pilot or passenger in a plane, and it has been found that a great percentage of clouds have small amounts of precipitation emitted therefrom although there is no indication of precipitation at ground level. The presence of precipitation indicates an unstable or weak point in the cloud; that is, a spot where water droplets are beginning to coalesce.

Once precipitation has been detected, the plane makes a pass over the cloud seeding at the unstable spot; that is, the spot where coalescence has commenced as evidenced by precipitation. Either surfactants, water-soluble polyelectrolytes or mixtures thereof are used in seeding the cloud, and these materials cause coalescence of the water droplets in the cloud which causes the forming of large drops of water which fall to the ground. The instability caused by the seeding of the cloud will spread causing coalescence and thereby rain throughout the entire cloud; however, this effect is enhanced by seeding the entire cloud with the materials. If no unstable point can be detected in the cloud, the cloud should be seeded with the materials in a pattern so as to cover the entire cloud.

Essentially, the same method as explained above may be used with hail suppression; however, the desired end result is not precipitation itself but the effect of stopping the vertical development of a cumulous cloud by causing water droplets therein to fall to the ground due to coalescence caused by either surfactants, polyelectrolytes or mixtures thereof thereby preventing water droplets from traveling in vertical cycles to build up the cloud in layers and preventing hail.

In fog dispersal, the method of dispensing materials is more important than in the methods mentioned above because normally a specified area is desired to be cleared to permit air and/or surface travel. Thus, winds must be contended with which otherwise would move new fog into the cleared area, and furthermore the area to be cleared is normally large and the dispersal must be complete.

A particular and most important application of fog dispersal techniques will be discussed hereinafter with respect to airports; however, the application to airports is illustrative and the steps taken may be used with any specified area to be cleared. There are two situations with which to contend in fog dispersal, and they are dispersal of developed fog banks and the prevention of the development of fog banks.

The optimum manner in which to keep an airport open at all times is to seed the fog as it begins to develop with fog-coalescent materials such as surfactants, water-soluble polyelectrolytes or mixtures thereof; however, due to airport traffic this is not always practical. Furthermore, most ground fogs develop at night due to radiation and, therefore, must be dispersed after full development. When treating a semideveloped fog bank the method is direct; that is, an aircraft is flown over as much of the fog as is possible while dispensing fog-coalescent materials; and, since during development, a fog bank does not have the equilibrium established in a fully developed fog, the instability of the fog coupled with the additional instability caused by the fog-coalescent materials permits the fog to be dispersed quickly.

With a fully developed fog, dispersal is not as easily accomplished and even though the dispensing of fog-coalescent materials such as surfactants, water-soluble polyelectrolytes and mixtures thereof in accordance with the present invention is effective, there are further methods useful for increasing their effectiveness according to the present invention. When there is a substantial wind present, a method of dispersing fog according to the present invention includes dispensing fog-coalescent materials from an airplane in a path transverse to the wind direction and upwind of the area to be cleared and thereafter working into the wind while dispensing fog-coalescent materials to provide a type of damming effect.

When there is no wind present, to disperse fog in accordance with a method of the present invention, the first step is to make an observation flight above the fog bank to detect unstable or weak spots. Weak spots, or points of instability and coalescence, are detectable due to their darkness which is caused by the lesser amount of light reflected by larger drops of water than the normal constituent water droplets in a fog bank. If a weak spot is detected, seeding is commenced at this spot and preferably fog-coalescent materials are dispensed while flying in ever increasing diameter circles around the weak spot. Many times the dispersal of fog in such a spot will act in the manner of pulling a stopper from a tub of water; that is, the remainder of the fog bank will flow towards the treated area, become unstable and coalesce. If this is not effective in itself, the next step is to dispense fog-coalescent materials in a path leading to the area to be cleared to permit easier flow. The results achieved by working on a weak spot in a fog bank are so good that any weak spot detected within a 5 mile radius of the area to be cleared should be worked before attacking the fog over the area to be cleared.

If no weak spots are detected, the first step is to fly a front course of the instrument landing system (ILS) of the airport, preferably over a central runway while dispensing fog-coalescent materials. It should be realized that a zero visability situation will probably exist thereby requiring the ILS; and, accordingly, a back course is then flown at approximately the same altitude. After one or more of these ILS seeding runs, the plane is then flown on top of the fog for observation. As previously mentioned, points of instability are easily detected due to their darkness, and if the ILS runs are effective, a dark depression having the appearance of a valley will be seen. After a period of time similar valleys, called windrows, will appear in parallel with the ILS valley and spread from the ILS path until ground is visible. Once ground is visible, the entire area to be cleared is covered with fog-coalescent materials in a followup pattern that is designed to completely disperse all fog over the area to be cleared. To this end, the pattern may be increasing diameter circular paths, crisscross paths or parallel paths, it being primarily important to use a pattern that will completely cover the area. It is noted that during followup, the pilot will have a view of the ground to permit visual guidance to control the pattern.

According to the present invention materials may be dispersed into the atmosphere from the air by utilizing an aircraft equipped with nozzles and a venturi secured to its underside. The nozzles are used to dispense materials in liquid form and are connected with tanks in the plane such that the materials dispensed and the amount thereof may be controlled by the pilot or a passenger in the plane. Thus, various materials may be dispensed simultaneously from separate nozzles or may be mixed in the tanks and dispensed from the same nozzle. Similarly, drums are disposed inside the plane and materials in powder form may be loaded therein for dispersing through the venturi either singularly or as mixtures.

Materials according to the present invention may be dispensed into the atmosphere from the ground by the use of a unit called fog-sweep manufactured by the John Bean Division of FMC Corporation. This unit includes a large air fan and a long flexible tube mounted on a trailer and is capable of dispensing liquid and powder materials more than 200 feet into the air. The unit can rotate on the trailer as the trailer is towed through a specified area to provide a good range of operation.

Due to the high molecular weight of the water-soluble polyelectrolytes for use in the present invention, it is desirable to dilute liquid polyelectrolytes with water, the proportions not being critical, in order to facilitate dispensing thereof. The rate of dispensing surfactants, polyelectrolytes or mixtures thereof in accordance with the present invention is not critical, and these materials need only be dispensed in small quantities due to their effectiveness and the precise methods of dispensing. For instance, in liquid form one-half pint to 1 gallon of the materials per mile is sufficient and in powder form the materials may be dispensed in the range of one-half of a pound to 10 pounds per mile with the maximum amount of material usually being determined by an economic factor.

It is not intended that the present invention be limited by the theories set forth above with respect to how the materials disperse fog and act on atmospheric conditions, it being of primary importance only that surfactants, polyelectrolytes and mixtures thereof are highly effective in dispersing fog, increasing rainfall and suppressing the formation of hail clouds.

What is claimed is:

1. A method for treating portions of the unconfined, nonvacuous atmosphere comprising dispensing therein at least one material selected from the group consisting of surfactants and water-soluble polyelectrolytes.

2. The method as recited in claim 1 wherein said material is dispensed in the atmosphere from a flying aircraft.

3. The method as recited in claim 2 wherein said material is in a powder form and is dispensed in the atmosphere from a venturi secured to the underside of the aircraft.

4. The method as recited in claim 2 wherein said material is in a liquid form and is dispensed in the atmosphere from a nozzle secured to the underside of the aircraft.

5. The method as recited in claim 1 wherein the material is a surfactant.

6. The method as recited in claim 5 wherein the surfactant is selected from the group consisting of alkyl phenyl ether of polyethylene glycol, trimethyl nonyl ether of polyethylene glycol, alkyl ether of polyalkylene glycols, $C_4H_9CH(C_2H_5)C_2H_4CH(SO_4Na)C_2H_4CH(C_2H_5)_2$, $[C_4H_9CH(C_2H_5)CH_2]_2NaPO_4$, $C_4H_9CH(CB2H_5)$ $)C_2H_4CH(SO_4Na)CH_2CH(CH_3)_2C_4H_9CH(C_2H_5)CH_2SO_4Na$, and $C_3H_7CH_2C(C_2H_5):CHSO_2ONa$ 7. The method as recited in claim 1 wherein the material is a water-soluble polyelectrolyte.

8. The method as recited in claim 7 wherein the water-soluble polyelectrolyte is a polymer having recurring units selected from the group consisting of sulfonium radicals, phosphonium radicals and ammonium radicals.

9. The method as recited in claim 1 wherein the material contains at least one surfactant and at least one water-soluble polyelectrolyte.